United States Patent [19]
Hermann

[11] 4,227,076
[45] Oct. 7, 1980

[54] OPTICAL POSITION DETERMINING OR TRACKING DEVICE

[75] Inventor: Joachim Hermann, Munich, Fed. Rep. of Germany

[73] Assignee: Bölkow Gesellschaft mit beschränkter Haftung, Ottobrunn bei Munich, Fed. Rep. of Germany

[21] Appl. No.: 464,269

[22] Filed: Jun. 11, 1965

[30] Foreign Application Priority Data

Jun. 13, 1964 [DE] Fed. Rep. of Germany ........... 77251

[51] Int. Cl.$^3$ ................................................. G01J 1/20
[52] U.S. Cl. ............................ 250/203 R; 250/214 B
[58] Field of Search ............ 250/203, 209, 220, 214 B

[56] References Cited
U.S. PATENT DOCUMENTS

| | | | |
|---|---|---|---|
| 2,722,156 | 11/1955 | Warren | 250/209 |
| 2,803,752 | 8/1957 | Warren | 250/209 |
| 3,174,045 | 3/1965 | Whitney et al. | 250/209 |

*Primary Examiner*—Charles T. Jordan
*Attorney, Agent, or Firm*—Toren, McGeady and Stanger

EXEMPLARY CLAIM

1. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; means applying the difference of the electrical signal potentials to said control device to operate said adjusting means in a direction to balance the detector outputs; and switch means operable, responsive to initiation of the position determining procedure, to deactivate said control device.

14 Claims, 5 Drawing Figures

OPTICAL POSITION DETERMINING OR TRACKING DEVICE

This invention relates to optical position determining or tracking devices and, more particularly, to an optical position determining or tracking device including improved means for compensating for the background readiation of the object to be tracked or whose position is to be determined.

As is known, optical position determining or tracking devices are used to ascertain automatically the angular relation of an object with respect to a reference direction or plane, and to transform the angular relation into analogous electrical signals.

The effectiveness of such devices is sharply affected by the background radiation of the target object. In order to compensate for the background radiation, radiation detectors are used, and are tuned respectively to the emission spectrum of the object and to the emission spectrum of the background of the object. These radiation detectors are positioned in the image field of the optical position determining device, and are so interrelated that their outputs, which supply the electrical signals, are in opposing relation. By means of a shutter or diaphragm, the illuminated surface of one of the detectors, and preferably of that detector which is responsive to the background radiation, is changed with respect to the illuminated surface of the other detector responsive to the useful or effective radiation to be expected from the object, but which also receives the background radiation. Such change of the illuminated surface of the detector responsive to background radiation is continued for a period sufficient for the output signals of the two detectors to cancel each other. At such time, an object within the image field of the locating or position determining device can now be clearly observed by the detector which is responsive to the emission spectrum of the object.

Background radiation compensation of this type presupposes, however, a constant background radiation, and this generally is not the case. Consequently, in known locating or position determining devices of this type, an operator uses manually actuable adjusting means to effect corresponding or fine compensation of the background radiation, which is dependent upon the season or upon the time of day. However, such manual fine compensation requires not only time but also considerable skill on the part of the operator.

The present invention is directed to a solution of this particular problem. Starting with the realization that disturbance of the tracking or position determining procedure by the background radiation of an object is reduced in accordance with the increase in efficiency of the compensation for such radiation, in accordance with the invention a control arrangement for interrupting the radiation compensation or equalization procedure immediately prior to the positioning procedure proper is provided. This control arrangement or device has supplied thereto the output signals of the radiation detectors, and includes switching means which effects automatic equalization of the detector output signals.

By the invention arrangement, a compensation of the background radiation is obtained without requiring either manual manipulation or without requiring any appreciable time. This compensation is adapted or attuned to the prevailing conditions during the measuring or positioning procedure. The advantage is that the effectiveness, and particularly the range, of tracking or positioning determining devices, are significantly increased.

In the simplest embodiment of the invention, the control arrangement comprises a differential signal-forming amplifier which is connected with the two radiation detectors. The output of this amplifier is applied to a multiplying type of setting device, preferably including a motor adjusting a diaphragm operatively associated with one of the radiation detectors. The switching means for interrupting the equalization procedure effected by the control device preferably comprises switch means actuated automatically responsive to operation of the means for initiating the measuring or positioning procedure proper.

Upon initiation of the measuring procedure, the control circuit is opened or deactivated by such switch means, so that the compensation of the background radiation as effected by the last setting is maintained. At the same time, the line which conducts the differential output signal corresponding to the outputs of the radiation detectors is connected with the measuring channel proper of the tracking or position determining device.

As an alternative to changing the active surface of one of the radiation detectors, compensation can be effected by changing one of the output signals of the radiation detectors. For this purpose, the motor of the control arrangement is connected with a potentiometer incorporated in the circuit of the output signals of the radiation detectors.

Instead of a motor, an integration amplifier may be used to feed a multiplication arrangement preferably including a photo-resistance multiplier. In the latter case, photocells are used as radiation detectors, and are responsive to respective different emission spectra. These photocells are arranged in opposing relationship and are in circuit connection with an ohmic resistance and a photo-resistance. The photo-resistance is operatively associated with a light source whose illumination is controlled by the integration amplifier. The photo-resistance and the light source together form the photo-resistance multiplier. The input signal to the control device comprises the sum of the illumination responsive outputs of the photocells. Equalization of the output signals is effected in such a manner that the effective illumination of the light source, or the effective brightness thereof, is varied until the output signals of both radiation detectors are equalized.

An arrangement of this type responds more rapidly than a control arrangement including a motor-operated diaphragm. However, due to drift error of the integration amplifier, the compensation effected prior to the measuring or positioning procedure proper may be adversely affected during the measuring procedure. According to a further embodiment of the invention, the signals used for compensating the background radiation are derived at the output of the measuring amplifier proper, and thus are the signals which normally represent the position information of the object in the image field of the tracking or position determining device.

For this latter purpose, the output signal supplied by the useful background radiation detector and the output signal provided by the compensation detector are separated and are supplied in alternation to the common signal amplifier through a periodically operable reversing switch or reverser. In synchronism with this periodic reversal, the output of the signal amplifier to servo amplifiers of different polarity, included in the control device, is also periodically reversed or alternated. These servo amplifiers, through a motor controlled by the output signals thereof, and through a diaphragm adjusted by the motor, effect compensation of the background radiation in the manner previously described. In this embodiment also, switching means are provided which, upon initiation of the measuring or position procedure proper, discontinue the separation of the output signals of the radiation detectors and connect the output of the signal amplifier with the measuring channel proper.

The effectiveness of the control arrangement is thus interrupted, and the tracking or position determining of an object in the image field of the device is effected with the compensation of the background radiation as last set.

In a preferred embodiment of the invention, two different but closely adjacent compensation positions are compared with each other. This is effected by conjoint adjustment of two closely adjacent, rigidly interconnected, adjustable taps on a potentiometer or the like. The output is periodically switched or alternated between these two taps, and the voltage divider or potentiometer bridges the output of the two opposing photocells responsive to respectively different spectral sensitivities. The thus tapped signal potentials are applied through a common measuring or signal amplifier to a control device, and this control device conjointly adjusts the two taps until the smallest effective signal potential is obtained. This adjustment of the two taps is effected by means of a motor, and always takes place in the direction of that tap which supplies the smaller effective signal potential.

As in the other embodiments, in this embodiment switching means are provided to cut off or deactivate the control device when the measuring or positioning procedure proper is initiated. Thus, the last set compensation of the background radiation is effective during the measuring procedure. At the same time, and by short circuiting both taps, the measuring amplifier, which is now connected with the measuring channel, is supplied with a signal potential which corresponds to the center or intermediate value of the two equal value compensating positions determined by the control arrangement. This is a potential whose disturbing background portion is insignificant insofar as tracking or position determining information is concerned.

Accordingly, an object of the present invention is to provide an optical position-determining or tracking device with improved compensation for background radiation of the object whose position is to be determined.

Another object of the invention is to provide such an optical position-determining or tracking device in which control means effecting compensation for background radiation are disconnected immediately prior to the measuring or positioning procedure proper.

A further object of the invention is to provide a position-determining or tracking device, including control means compensating for background radiation of the object whose position is to be determined, and further including means for deactivating said control means responsive to actuation of means initiating the positioning procedure proper.

For an understanding of the principles of the invention, reference is made to the following description of typical embodiments thereof as illustrated in the accompanying drawings.

In the drawings, and for the sake of simplification, only those parts of an optical position-determining or tracking device have been shown which have a direct functional relation with the control device for compensating for background radiation. Those parts of the optical position determining or tracking device illustrated in the drawings will be referred to, hereinafter, for convenience, as the "goniometer".

Figure 1:
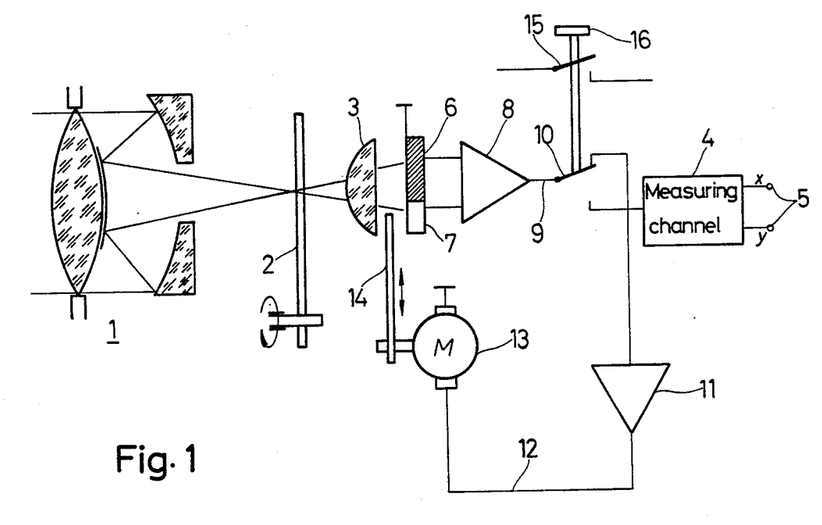
FIGS. 1 through 5 are schematic diagrams of respective different embodiments of an automatic control device for compensating background radiation in an optical position determining or tracking device, in accordance with the invention.

Thus, in FIG. 1, the goniometer is illustrated as including an objective 1 with which is associated a diaphragm or shutter 2 driven in the direction of the arrow in any suitable manner. This diaphragm or shutter is frequently referred to as the "analyzer" or "reticule". The goniometer further includes a field lens 3 and an amplifier having a measuring channel 4 provided with a discriminator and the like. The measuring potentials are derived at the outputs 5 of measuring channel 4, these measuring potentials being associated, respectively, with the x and y coordinates of an object appearing in the image field of the goniometer. Two radiation detectors 6 and 7 are positioned behind field lens 3. Of these detectors, the detector 6 is associated with the useful signal generation, while the detector 7 is associated with the compensation signal generation.

The output signals of detectors 6 and 7, which are in opposing relation, are applied electrically to the input of a differential amplifier 8 whose output is connected through a line 9 to the movable element of a reversing switch 10 which may be operated to connect line 9 either to measuring channel 4 or to a servo-amplifier 11. In its unoperated or normal first position shown in the drawings, reversing switch 10 connects line 9 to servo-amplifier 11 which, through a line 12, controls the operation of a motor 13. Motor 13 operates a compensation diaphragm or shutter 14 which may, for example, cooperate with detector 7 associated with the compensation signal generation, and which is responsive to the background radiation.

The measuring or positioning procedure is initiated by operating a key 16. This key 16 closes a switch 15 which completes a circuit for the positioning and measuring procedure. Switch 15, in accordance with the invention, is connected mechanically to reversing switch 10, so that, when switch 15 is closed by operating key 16, switch 10 is transferred to its second position to connect the output of differential amplifier 9 to measuring channel 4. This opens or interrupts the control circuit for the background radiation compensation.

The combined signals of detectors 6 and 7 are thus applied to measuring channel 4 at whose outputs 5 the x and y coordinates of the object in the image field of the goniometer can be derived. By contrast, when the goniometer is active, the signals from detectors 6 and 7, as a combined signal, are applied through line 9 and reversing switch 10 to servo-amplifier 11 controlling motor 13. The motor 13 is thus energized as long as there exists a difference between the output signals of detectors 6 and 7. Motor 13 adjusts compensation diaphragm 14 in a direction to compensate or equalize the signals supplied by detectors 6 and 7 and which are in opposing relation. The compensation diaphragm 14, when operated by motor 13, varies or changes the active surface of detector 7 associated with the background radiation. Upon initiation of the measuring procedure proper by operation of key 16, this control procedure is interrupted and the measuring procedure is effected with the last adjusted compensation of the background radiation.

Figure 2:
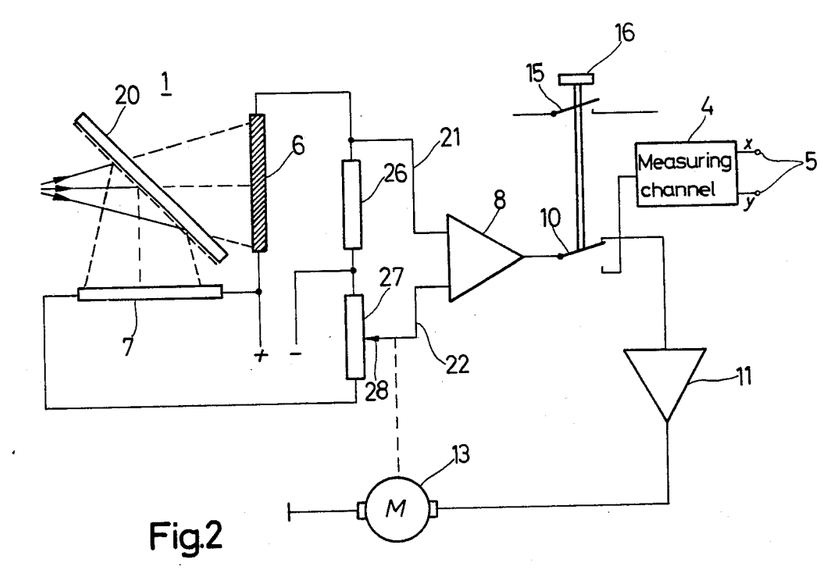

In the embodiment of the invention shown in FIG. 2, compensation of the background radiation is effected by changing the output signal of one of the radiation detectors of the goniometer. A somewhat different optical system is illustrated in FIG. 2, in which the objective 1 includes a light ray dividing mirror 20 in association with radiation detectors 6 and 7. Other than this, the embodiment of FIG. 2 differs from that of FIG. 1 in that detectors 6 and 7 have operatively associated therewith resistances 26 and 27, respectively. Resistance 27 is in the form of a potentiometer having an adjustable tap 28 driven by motor 13.

The signal potential of detector 7, which latter may be responsive to the background radiation, is applied across potentiometer 27. Through a line 22 connected to adjustable tap 28, the signal potential of detector 7 is supplied to a differential amplifier 8. The signal potential of detector 6, which latter may be responsive to the useful radiation of the object under examination, is applied directly to amplifier 8 through line 21.

In the same manner as in the embodiment of FIG. 1, an operating key 16 is provided for initiating the measuring procedure proper, and this operating key controls the switch 15 which again is mechanically connected to reversing switch 10 for conjoint operation with the latter. The operation of the embodiment of FIG. 2 is otherwise the same as the operation of the embodiment of FIG. 1.

Figure 3:
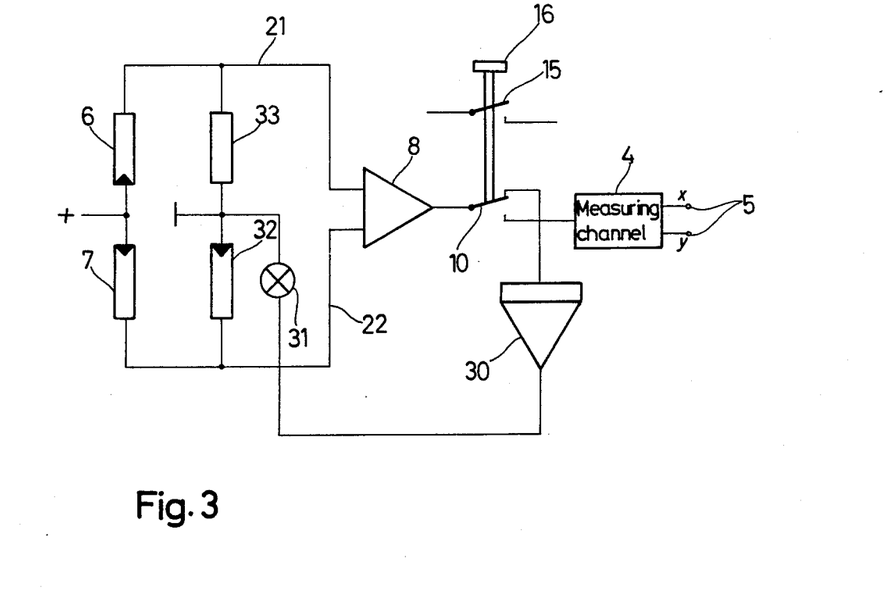

In the embodiment shown in FIG. 3, radiation detectors 6 and 7 are illustrated as photocells connected in opposition and each tuned to respective different emission spectra. The control circuit normally completed by reversing switch 10 includes integrating amplifier 30 which is substituted for the motor 13 of the embodiments of the invention shown in FIGS. 1 and 2. Amplifier 30 controls the illumination of a lamp 31 forming part of a photo-resistance multiplier including lamp 31 and a photo-resistance 32.

Photo-resistance 32 has applied thereto the output of radiation detector 7, and the output of radiation detector 6 is applied across a working resistance 33. The outputs of the photocell detectors 6 and 7 are supplied, through lines 21 and 22, respectively, to the inputs of differential amplifier 8 which combines the signal from detector 6, associated with the useful radiation energy from the object under examination, and the detector 7 associated with the background radiation or disturbance energy.

Equalization or balancing of the two output signals is effected by the integrating amplifier 30 controlling the illumination of lamp 31. The illumination of lamp 31, under the control of integrating amplifier 30, corresponds directly to the value of the differential signal potential at the output of differential amplifier 8. Thus, the output potential of detector 7 is combined with the potential drop across photo-resistance 32, which latter is varied by the control circuit in such a manner that the effective output signal potential of detector 7 is decreased until there is no control potential at the input of integrating amplifier 30.

In the embodiment of FIG. 3, as in the embodiments of FIGS. 1 and 2, initiation of the measuring procedure is effected by operating key 16 to close switch 15 and reverse switch 10. The embodiment of FIG. 3 operates in the same manner as the embodiments of FIGS. 1 and 2.

Figure 4:
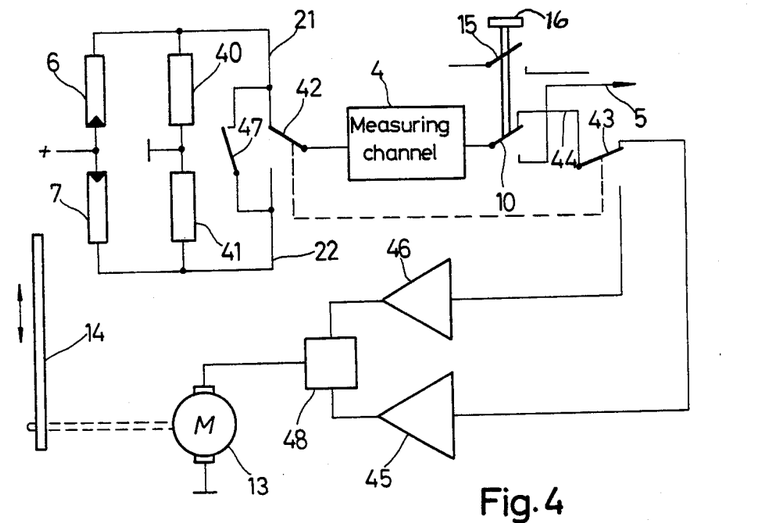

Compensation of the background radiation may also be effected by utilizing the signals at the outputs 5 of the measuring channel 4, as illustrated in FIG. 4. Referring to FIG. 4, the radiation detectors 6 and 7 are again connected in opposition. Detector 6, responsive to the useful radiation from the object under examination, is in the nature of a photocell having operatively associated therewith a working resistance 40. Detector 7, which is responsive to the background radiation, has operatively associated therewith a working resistance 41. The outputs of the radiation detectors 6 and 7 are supplied to lines 21 and 22, respectively.

A periodically or cyclically operable reversing switch or reverser device 42 is operable in synchronism with a similarly operable reversing switch or reverser device 43. Reversing switch 42 connects lines 21 and 22 cyclically in alternation to measuring channel 4. Reversing switch 43 connects the output of measuring channel 4, with reversing switch 10 in the illustrated position, cyclically in alternation to servo-amplifiers 45 and 46. The outputs of servo-amplifiers 45 and 46 are applied, through a smoothing summation and filtering member 48, to control motor 13 which adjusts a diaphragm 14 associated with radiation detector 7 for the background radiation.

A switch 47 is operated by key 16 simultaneously with operation of reversing switch 10 by key 16. By means of switch 47, lines 21 and 22 are short circuited at the start of the measuring and positioning procedure proper. Furthermore, upon operation of key 16, reversing devices 42 and 43 are made inoperative.

In the arrangement shown in FIG. 4, the signals supplied by detectors 6 and 7 are separated and supplied, in cyclical alternation, to the common measuring channel or signal amplifier 4 through the cyclically operable reversing device 42. Prior to actuation of key 16, which means before the measuring or positioning procedure is initiated, the output of amplifier 4 is applied through the reversing switch 10 through line 44 to the cyclically operable reversing device 43, so that the respective signals are supplied cyclically in alternation to the servo-amplifiers 45 and 46. These servo-amplifiers are connected in opposition, and their output signals are applied through the smoothing summation member 48, which also acts as a filter, to control the motor 13. In this manner, diaphragm 14 is adjusted in a compensating direction to control the background radiation during the period until the signal outputs of radiation detectors 6 and 7 become substantially equal. Upon initiation of the positioning procedure proper, the control circuit is interrupted by reversal of switch 10 and, with switch 47 closed, the signal potentials are combined and supplied to amplifier 4. The output of amplifier 4 is supplied through measurement line or channel 5 to further signal processing components of a known type.

Figure 5:
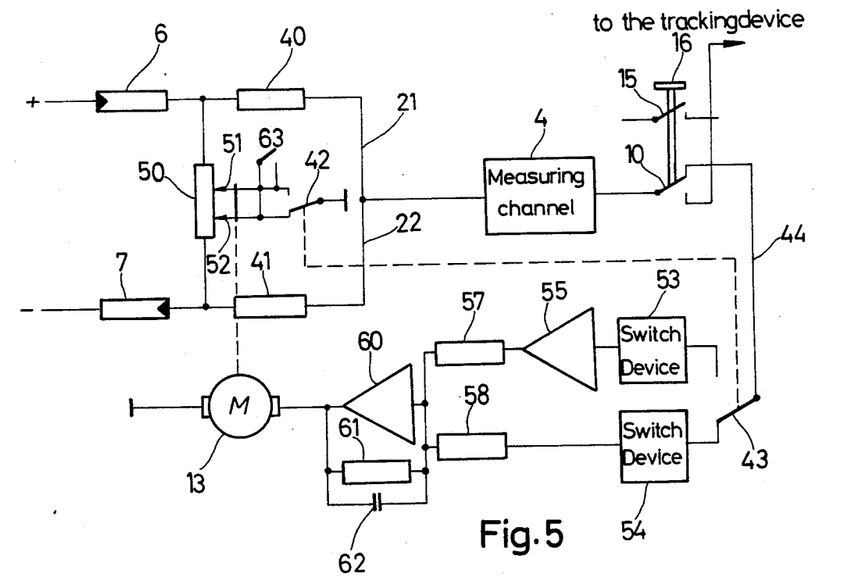

FIG. 5 illustrates a preferred embodiment of the control circuit of the invention in which two different, but closely adjacent, compensation positions of the radiation detectors are compared, with respect to their positioning or orientation signals, for a time sufficient to derive the smallest effective differential signal potential, which means until the desired compensation of the background radiation has been obtained.

Referring to FIG. 5, the radiation detectors 6 and 7, with their respective working resistances 40 and 41, are connected directly through lines 21 and 22 to the input of common signal amplifier 4. In addition, the outputs of the opposing detectors 6 and 7 are bridged by a voltage divider 50 in the form of a potentiometer. This potentiometer has two closely adjacent, fixedly interconnected adjustable taps 51 and 52 conjointly operated by motor 13 of the control circuit.

The output of amplifier or measuring channel 4 is supplied through reversing switch 10 and a line or compensation channel 44 to a reversing switch 43 operated in synchronism with reversing switch 42. Reversing devices 42 and 43 are, in the same manner as described for FIG. 4, cyclically or periodically operating reversing switches. Thus, the reversing switch 42 connects the taps 51 and 52 to ground in a cyclically alternating manner.

Reversing device 43 supplies the radiation detector output signals in cyclical alternation to directional switching devices 53 and 54 which provide effective values. Switching device 53 is connected through a servo-amplifier 55 and a summation resistance 57 to a further servo-amplifier 60, and switching device 54 is connected through a summation resistance 58 to servo-amplifier 60. A direction filter, comprising the parallel combination of a resistance 61 and a condenser 62, is connected in parallel with servo-amplifier 60. The output of servo-amplifier 60 controls motor 13 which conjointly adjusts taps 51 and 52 of potentiometer 50.

The control circuit effecting compensation of the background radiation prior to initiation of the measuring or positioning procedure proper is interrupted, as in the previously described embodiments of the invention, by operation of key 16 which reverses the switch 10. At the same time, key 16 operates switch 63 which short circuits the taps 51 and 52 so that the combined signal potential from the detectors 6 and 7, which is now supplied to amplifier measuring channel 4, corresponds to an average compensation position which is even closer to the best possible compensation position than either of the finely adjusted taps 51 and 52.

While specific embodiments of the invention have been shown and described in detail to show the application of the principles of the invention, it will be understood that the invention may be embodied otherwise without departing from such principles.

What is claimed is:

1. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; means applying the difference of the electrical signal potentials to said control device to operate said adjusting means in a direction to balance the detector outputs; and switch means operable, responsive to initiation of the position determining procedure, to deactivate said control device.

2. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; means comparing the two electric signal potentials to provide a differential signal potential; means applying said differential signal potential to said control device to operate said adjusting means in a direction to balance the detector outputs; and switch means operable responsive to initiation of the position determining procedure to deactivate said control device.

3. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential potential representing the difference between the two electrical signal potentials; means connecting the output of said amplifier to said control device to operate said adjusting means in a direction to balance the detector outputs; and switch means operable, responsive to initiation of the position determining procedure, to disconnect the output of said amplifier from said control device.

4. In an optical device for determining the position of a body, having a measuring channel, and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output a differential potential representing the difference between the two electric signal potentials; means connecting the output of said amplifier to said control device to operate said adjusting means in a direction to balance the detector outputs; and switch means operable, responsive to initiation of the position determining procedure, to disconnect the output of said amplifier from said control device, and to connect the output of said amplifier to said measuring channel.

5. In an optical device for determining the position of a body, having a measuring channel, and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable, responsive to initiation of the position determining procedure, to transfer said reversing switch from its first position to its second position.

6. In an optical device for determining the position of a body, having a measuring channel and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable responsive to initiation of the position determining procedure, to transfer said reversing switch from its first position to its second position; said adjusting means comprising diaphragm means cooperable with the radiation detector responsive to the emission spectrum of the background of the body; said control device comprising a motor operable to adjust said diaphragm means and a servo-amplifier controlling said motor and connected to the output of said differential amplifier in the first position of said reversing switch.

7. In an optical device for determining the position of a body, having a measuring channel and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable, responsive to initiation of the position determining procedure, to transfer said reversing switch from its first position to its second position; said adjusting means comprising a potentiometer connected to the output of one of said detectors and having an adjustable tap; said control device comprising a motor connected to said tap to adjust the same and a servoamplifier controlling said motor and connected to the output of said differential amplifier in the first position of said reversing switch.

8. In an optical device for determining the position of a body, having a measuring channel and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable, responsive to initiation of the position determining procedure, to transfer said reversing switch from its first position to its second position; said adjusting means comprising a potentiometer connected in the output of the radiation detector responsive to the emission spectrum of the background of the body and having an adjustable tap; there being a fixed resistance connected in the output of the other detector and in opposition to said potentiometer; said control device including a motor connected to said tap to adjust the same and a servo-amplifier controlling said motor and connected to the output of said differential amplifier in the first position of said reversing switch.

9. In an optical device for determining the position of a body, having a measuring channel and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable, responsive to initiation of the position determining procedure, to transfer said reversing switch from its first position to its second position; said detectors comprising photocells responsive to respective different emission spectra and electrically interconnected in opposition with each other; said adjusting means comprising a resistance-type multiplication device electrically connected in adding relation with the photocell responsive to the emission spectrum of the background of the body; said control device comprising an integrating amplifier connected in controlling relation with said multiplication device and connected to the output of said differential amplifier in the first position of said reversing switch.

10. In an optical device for determining the position of a body, having a measuring channel and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a differential amplifier having its input connected to the outputs of said detectors and providing, at its output, a differential signal potential corresponding to the difference between said electric signal potentials; a reversing switch connected to the output of said amplifier and having a first and normal position connecting the output of said amplifier to said control device to operate said adjusting means in a direction to balance the detector outputs, and a second position disconnecting the output of said amplifier from said control device and connecting the output of said amplifier to said measuring channel; and means operable, responsive to initiation of the position determining procedure, to transfer said reversing switch from its first position to its second position; said detectors comprising photocells responsive to different respective emission spectra and electrically interconnected in opposition to each other; said adjusting means comprising a photo-resistance multiplier electrically connected in adding relation with the photocell responsive to the emission spectrum of the background of the body; there being a fixed resistance connected to the other photocell and in opposition to said photo-resistance multiplier; said control device comprising a light source in operative relation with said photo-resistance multiplier and an integrating amplifier controlling the illumination of said light source and connected to the output of said differential amplifier in the first position of said reversing switch.

11. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; a signal amplifier; a first cyclically operable reverser operable to connect the input of said amplifier in cyclical alternation to the outputs of said two detectors; a reversing switch connected to the output of said signal amplifier and having a first position normally connecting the output of said signal amplifier to a compensation channel, and a second position connecting the output of said signal amplifier to a measuring channel, a pair of servo-amplifiers; a second cyclically operable reverser operable in synchronism with said first cyclically operable reverser and effective to connect said compensation channel cyclically in alternation to the inputs of said servo-amplifiers; a filtering and summation device; means connecting the outputs of said servo-amplifiers in opposition to said filtering and summation device; said adjusting means comprising a diaphragm operatively associated with the photocell responsive to the emission spectrum of the background of the body; said control device comprising a motor operable to adjust said diaphragm and controlled by the output of said filtering and summation device; and means operable, responsive to initiation of the position-determining procedure, to transfer said reversing switch from its first position to its second position and concurrently to connect the outputs of both detectors in common to the input of said signal amplifier through said first cyclically operable reverser.

12. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; said adjusting means comprising a voltage divider connected across the outputs of said detectors and having two closely spaced and rigidly interconnected adjustable taps; a common signal amplifier; means connecting the input of said common signal amplifier to the outputs of said detectors; first cyclically operable reversing means operable to cyclically alternately connect said adjustable taps to ground; a compensation channel; a measurement channel; a reversing switch connected to the output of said signal amplifier and having a first normal position connecting said output to said compensation channel and a second transferred position connecting said output to said measurement channel; first and second switching devices arranged to provide effective signal values at their outputs; a second cyclically operable reverser operable in synchronism with said first cyclically operable reverser, and effective to connect said compensation channel cyclically alternately to the inputs of said switching devices; said control device comprising a motor operable to conjointly adjust said adjustable taps; a servo-amplifier having its input connected to the outputs of both of said switching devices and its output connected to said motor to operate said motor to adjust said adjustable contacts in a direction to reduce the value of the output of said signal amplifier to the smallest effective signal voltage; and means operable, responsive to initiation of the position determining procedure, to transfer said reversing switch to its second position and concurrently to connect both of said adjustable taps to ground through said first cyclically operable reverser.

13. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; said adjusting means comprising a voltage divider connected across the outputs of said detectors and having two closely spaced and rigidly interconnected adjustable taps; a common signal amplifier; means connecting the input of said common signal amplifier to the outputs of said detectors; first cyclically operable reversing means operable to cyclically alternately connect said adjustable taps to ground; a compensation channel; a measurement channel; a reversing switch connected to the output of said signal amplifier and having a first normal position connecting said output to said compensation channel and a second transferred position connecting said output to said measurement channel; first and second switching devices arranged to provide effective signal values at their outputs; a second cyclically operable reverser operable in synchronism with said first cyclically operable reverser, and effective to connect said compensation channel cyclically alternately to the inputs of said switching devices; said control device comprising a motor operable to conjointly adjust said adjustable taps; a servo-amplifier having its input connected to the outputs of both of said switching devices and its output connected to said motor to operate said motor to adjust said adjustable contacts in a direction to reduce the value of the output of said signal amplifier to the smallest effective signal voltage; means operable, responsive to initiation of the position determining procedure, to transfer said reversing switch to its second position and concurrently to connect both of said adjustable taps to ground through said first cyclically operable reverser; a second servo-amplifier and a first summation resistance in series with each other connecting the output of said first switching device to the input of said first-mentioned servo-amplifier; and a second summation resistance connecting the output of said second switching device to the input of said first-mentioned servo-amplifier.

14. In an optical device for determining the position of a body and including compensation means for the background radiation of the body, the compensation means including two radiation detectors, one responsive to the emission spectrum of the body and the other responsive to the emission spectrum of the background of the body, and having respective outputs supplying respective electric signal potentials corresponding to the radiation effective thereupon with the detector outputs being opposed to each other, and adjusting means operable to change the output of at least one detector prior to initiation of the position determining procedure; the improvement comprising, in combination, a control device for said adjustment means; said adjusting means comprising a voltage divider connected across the outputs of said detectors and having two closely spaced and rigidly interconnected adjustable taps; a common signal amplifier; means connecting the input of said common signal amplifier to the outputs of said detectors; first cyclically operable reversing means operable to cyclically alternately connect said adjustable taps to ground; a compensation channel; a measurement channel; a reversing switch connected to the output of said signal amplifier and having a first normal position connecting said output to said compensation channel and a second transferred position connecting said output to said measurement channel; first and second switching devices arranged to provide effective signal values at their outputs; a second cyclically operable reverser operable in synchronism with said first cyclically operable reverser, and effective to connect said compensation channel cyclically alternately to the inputs of said switching devices; said control device comprising a motor operable to conjointly adjust said adjustable taps; a servo-amplifier having its input connected to the outputs of both of said switching devices and its output connected to said motor to operate said motor to adjust said adjustable contacts in a direction to reduce the value of the output of said signal amplifier to the smallest effective signal voltage; means operable, responsive to initiation of the position determining procedure, to transfer said reversing switch to its second position and concurrently to connect both of said adjustable taps to ground through said first cyclically operable reverser; a second servo-amplifier and a first summation resistance in series with each other connecting the output of said first switching device to the input of said first-mentioned servo-amplifier; a second summation resistance connecting the output of said second switching device to the input of said first-mentioned servo-amplifier; and a restoring filter, comprising a parallel connected resistance and condenser, connected in parallel with said first-mentioned servo-amplifier.

* * * * *